US012559607B2

(12) United States Patent
Yoon et al.

(10) Patent No.: US 12,559,607 B2
(45) Date of Patent: Feb. 24, 2026

(54) FLAME-RETARDANT COMPOSITE PAD, METHOD FOR MANUFACTURING SAME, AND SECONDARY BATTERY MODULE AND SECONDARY BATTERY PACK COMPRISING SUCH COMPOSITE PAD

(71) Applicants: LG Energy Solution, Ltd., Seoul (KR); Konkuk University Industrial Cooperation Corp, Seoul (KR)

(72) Inventors: Yeo-Min Yoon, Daejeon (KR); Bum-Young Jung, Daejeon (KR); Jeong-Ho Ha, Daejeon (KR); Ki-Jae Kim, Seoul (KR); Yong-Keon Ahn, Seoul (KR); Kyu-Bin Lee, Seoul (KR)

(73) Assignees: LG Energy Solution, Ltd., Seoul (KR); Konkuk University Industrial Cooperation Corp, Seoul (KR)

( * ) Notice: Subject to any disclaimer, the term of this patent is extended or adjusted under 35 U.S.C. 154(b) by 815 days.

(21) Appl. No.: 17/795,768

(22) PCT Filed: Jan. 27, 2021

(86) PCT No.: PCT/KR2021/001086
§ 371 (c)(1),
(2) Date: Jul. 27, 2022

(87) PCT Pub. No.: WO2021/153988
PCT Pub. Date: Aug. 5, 2021

(65) Prior Publication Data
US 2023/0083006 A1       Mar. 16, 2023

(30) Foreign Application Priority Data
Jan. 28, 2020    (KR) ........................ 10-2020-0009902

(51) Int. Cl.
*C08K 3/22*        (2006.01)
*C08K 3/16*        (2006.01)
*H01M 50/143*      (2021.01)

(52) U.S. Cl.
CPC ................. *C08K 3/22* (2013.01); *C08K 3/16* (2013.01); *H01M 50/143* (2021.01); *C08K 2003/2224* (2013.01); *C08K 2003/2227* (2013.01)

(58) Field of Classification Search
None
See application file for complete search history.

(56) References Cited

U.S. PATENT DOCUMENTS

| | | |
|---|---|---|
| 2001/0049025 A1 | 12/2001 | Kollaja et al. |
| 2010/0104844 A1 | 4/2010 | Rollins et al. |
| 2011/0213065 A1 | 9/2011 | Giesselbach et al. |
| 2018/0254533 A1 | 9/2018 | Nam et al. |
| 2020/0377690 A1 | 12/2020 | Ootsuki et al. |
| 2021/0013460 A1 | 1/2021 | Ootsuki et al. |

FOREIGN PATENT DOCUMENTS

| | | |
|---|---|---|
| CN | 102216377 A | 10/2011 |
| CN | 206505952 U | 9/2017 |
| CN | 108028448 A | 5/2018 |
| JP | H1110808 A | 1/1999 |
| JP | 2001226581 A | 8/2001 |
| JP | 2004008448 A | 1/2004 |
| JP | 2012506327 A | 3/2012 |
| JP | 2018206605 A | 12/2018 |
| JP | 2019083150 A | 5/2019 |
| JP | 2019147357 A | 9/2019 |
| JP | 2019175806 A | 10/2019 |
| JP | 2019204637 A | 11/2019 |
| KR | 20010032625 A | 4/2001 |
| KR | 20090112258 A | 10/2009 |
| KR | 20100071634 A | 6/2010 |
| KR | 20190044872 A | 5/2019 |
| WO | 2019163839 A1 | 8/2019 |
| WO | 2019163841 A1 | 8/2019 |

OTHER PUBLICATIONS

Extended European Search Report including Written Opinion for Application No. 21747141.6 dated May 17, 2023, pp. 1-9.
International Search Report for PCT/KR2021/001086 dated May 13, 2021. 3 pgs.
Sato, H. et al., "Discrimination between Natural Calcium Carbonate and Synthetic Calcium Carbonate" Central Customs Laboratory Bulletin No. 59, Central Customs Laboratory, Ministry of Finance, 6-3-5, Kashiwanoha, Kashiwa, Chiba 277-0882 Japan, 2019, pp. 101-112, vol. 59.
Lu, Yunchun. "Development of Multi-Resistant Cable Used for Marine Equipment" Optical Fiber & Electric Cable and Their Applications, Apr. 2018, pp. 1-5. No. 2. [English Translation of Abstract only].

(Continued)

*Primary Examiner* — Robert T Butcher
(74) *Attorney, Agent, or Firm* — Lerner David LLP

(57) ABSTRACT

There are provided a flame retardant element for suppressing flame propagation when a fire occurs during the use of a lithium secondary battery, thereby ensuring safety of the secondary battery while in use, a method for manufacturing the flame retardant element, and a secondary battery module and a secondary battery pack comprising the flame retardant element. The proposed flame retardant element is a composite pad having a stack of at least two polymer resin single layers including fire extinguishing materials having different fire extinguishing and flame retardant mechanisms, the composite pad includes a first polymer resin single layer and a second polymer resin single layer, and the first polymer resin single layer includes the fire extinguishing material which takes effect in a lower temperature range than the second polymer resin single layer.

16 Claims, 6 Drawing Sheets

(56)  References Cited

OTHER PUBLICATIONS

Search Report dated Dec. 8, 2023 from the Office Action for
Chinese Application No. 202180010750.5 Issued Dec. 15, 2023, pp.
1-3.

FLAME-RETARDANT COMPOSITE PAD, METHOD FOR MANUFACTURING SAME, AND SECONDARY BATTERY MODULE AND SECONDARY BATTERY PACK COMPRISING SUCH COMPOSITE PAD

CROSS-REFERENCE TO RELATED APPLICATIONS

The present application is a national stage entry under 35 U.S.C. § 371 of International Application No. PCT/KR2021/001086, filed on Jan. 27, 2021, published in Korean, which claims priority to Korean Patent Application No. 10-2020-0009902, filed on Jan. 28, 2020, the disclosures of which are hereby incorporated herein by reference in their entireties.

TECHNICAL FIELD

The present disclosure relates to a flame retardant element and a device comprising the same, and more particularly, to a flame retardant composite pad and a secondary battery module and a secondary battery pack comprising the same.

BACKGROUND ART

With the development of technology, there is a growing interest in energy storage technology, and as the range of applications extends to mobile phones, camcorders and laptop PCs, many efforts have been made to the research and development of electrochemical devices. Among the electrochemical devices, attention is directed towards the development of rechargeable secondary batteries. In particular, lithium secondary batteries have an operating voltage of about 3.6V and have not only higher capacity than nickel-cadmium batteries or nickel-hydrogen batteries widely used as a source of power for electronic devices but also high energy density per unit weight, so their usage tends to dramatically increase. Recently, pouch type secondary batteries are being widely used since they are easy to be applied to electric products of various designs and have the reduced volume, and a pouch type secondary battery includes a hermetically sealed pouch case made of a film in which an electrode assembly and an electrolyte solution are received.

However, the secondary battery may explode when overheated, and thus ensuring safety is one of the grave issues. The secondary battery is overheated by many causes, and one of the causes is a flow of overcurrent above the limit through the secondary battery. When the overcurrent flows, the secondary battery generates heat by joule heating and the internal temperature of the secondary battery sharply increases. Additionally, the rapid temperature rise causes decomposition reaction of the electrolyte solution, causing thermal runaway, and at the end, the secondary battery explodes. The overcurrent occurs when a sharp metal object penetrates the secondary battery, dielectric breakdown occurs between the positive electrode and the negative electrode due to the shrinkage of the separator interposed between the positive electrode and the negative electrode or rush current is applied to the secondary battery due to a failure in an external charging circuit or load. In addition to the overcurrent, overcharging and external mechanical impacts cause abnormal heat generation, causing explosion or a fire in the secondary battery, and accordingly strict management is required.

The secondary battery is gaining attention as a source of power for electric vehicles (EVs) and hybrid electric vehicles (HEVs) presented as an alternative to gasoline vehicles and diesel vehicles using fossil fuel to solve the air pollution issue. A medium- or large-scale secondary battery module or secondary battery pack used for such purposes includes a plurality of lithium secondary batteries electrically connected to each other to provide output and capacity required for predetermined devices, and needs to maintain a stable structure against external forces.

The plurality of secondary batteries included in the secondary battery module or the secondary battery pack has a high output advantage compared to other batteries, but is vulnerable to safety due to the high explosion risks as described above. When the medium- or large-scale secondary battery module or secondary battery pack includes the plurality of secondary batteries, the stability issue is more serious.

In particular, when a fire occurs due to overheat of the secondary battery in the secondary battery module, the fire may spread to adjacent secondary batteries. In such a case, a massive fire and explosion may occur, resulting in a large fire accident. Accordingly, it is necessary to suppress flame propagation from the inside to the outside of the secondary battery, in order to produce rapid and sensitive countermeasures against explosions or dangerous situations of the medium- or large-scale secondary battery module or secondary battery pack.

DISCLOSURE

Technical Problem

The present disclosure is designed to solve the above-described problem, and therefore the present disclosure is directed to providing a flame retardant element for suppressing flame propagation when a fire occurs during the use of a lithium secondary battery, thereby ensuring safety of the secondary battery while in use, a method for manufacturing the flame retardant element, and a secondary battery module and a secondary battery pack comprising the flame retardant element.

Technical Solution

The proposed flame retardant element is a composite pad having a stack of at least two polymer resin single layers including fire extinguishing materials having different fire extinguishing and flame retardant mechanisms, and can effectively suppress fires or explosion in secondary batteries. The present disclosure also proposes a method for manufacturing the same and a secondary battery module and a secondary battery pack comprising the composite pad.

The composite pad according to the present disclosure is a composite pad having a stack of at least two polymer resin single layers including different types of fire extinguishing materials, wherein the composite pad includes a first polymer resin single layer and a second polymer resin single layer, and the first polymer resin single layer includes a fire extinguishing material which takes effect in a lower temperature range than the second polymer resin single layer.

Preferably, the composite pad includes the second polymer resin single layer sandwiched between the two first polymer resin single layers.

Here, the first polymer resin single layer may include poly(dimethyl siloxane) (PDMS) and aluminum hydroxide $(Al(OH)_3)$, and the second polymer resin single layer may include PDMS and calcium bromide $(CaBr_2)$.

In the present disclosure, the fire extinguishing material may be selected from solid materials including a metal hydroxide compound, a phosphorus-based and sulfuric acid compound and a halogen-based compound. The polymer resin may be methylmethacrylic resin, styrol resin, polyethylene resin, polyamide resin, phenol resin, silicon resin, epoxy resin or polyurethane resin.

The fire extinguishing material may be $Al(OH)_3$, magnesium hydroxide $(Mg(OH)_2)$ or $CaBr_2$.

The present disclosure also proposes a method for manufacturing a composite pad. The method is a method for manufacturing a composite pad including forming at least two polymer resin single layers including different types of fire extinguishing materials in a sequential order, wherein the composite pad includes a first polymer resin single layer and a second polymer resin single layer, and the first polymer resin single layer includes a fire extinguishing material which takes effect in a lower temperature range than the second polymer resin single layer.

In the method for manufacturing a composite pad according to the present disclosure, forming the at least two polymer resin single layers including different types of fire extinguishing materials in a sequential order includes mixing a first fire extinguishing material with a first polymer resin to prepare a first flame retardant composition, applying the first flame retardant composition and curing to form the first polymer resin single layer, mixing a second fire extinguishing material with a second polymer resin to prepare a second flame retardant composition, and applying the second flame retardant composition to the first polymer resin single layer and curing to form the second polymer resin single layer.

Here, preparing the first flame retardant composition may include adding the first fire extinguishing material in an amount of more than 0 and 50% or less to the first polymer resin to form a first mixture, stirring the first mixture, and adding a curing agent to the first mixture, and preparing the second flame retardant composition may include adding the second fire extinguishing material in an amount of more than 0 and 80% or less to the second polymer resin to form a second mixture, stirring the second mixture, and adding a curing agent to the second mixture. Additionally, the first fire extinguishing material may include $Al(OH)_3$, and the second fire extinguishing material may include $CaBr_2$.

A secondary battery module according to the present disclosure includes the composite pad according to the present disclosure.

A secondary battery pack according to the present disclosure includes the secondary battery module according to the present disclosure.

Advantageous Effects

According to the present disclosure, there is the composite pad for effectively suppressing a fire or explosion in a secondary battery. The composite pad includes the first polymer resin single layer and the second polymer resin single layer, and the fire extinguishing effect may be exerted stepwise according to the temperature with varying working temperature ranges of each fire extinguishing material in each polymer resin single layer.

In particular, when the first polymer resin single layer corresponding to the outermost layer includes the fire extinguishing material that takes the fire extinguishing and flame retardant effect in the low temperature range, and the second polymer resin single layer corresponding to the inner layer includes the fire extinguishing material that implements the fire extinguishing mechanism at high temperatures, the temperature gently rises from the low temperature range to the high temperature (before a fire occurs) over time. That is, the thermal propagation suppression effect is superior.

The composite pad is inserted between secondary batteries to suppress flames propagation to the outside of the secondary battery when the flames occur in the secondary battery due to abnormal behaviors. It is possible to minimize additional chain reaction and damage caused by the flames occurred in the secondary battery.

The composite pad according to the present disclosure may improve safety in a secondary battery module or a secondary battery pack comprising the same.

DETAILED DESCRIPTION

Figure 1:
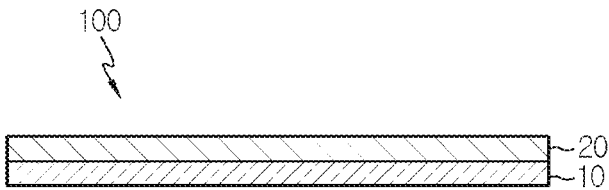
FIG. 1 is a cross-sectional view of a composite pad according to an embodiment of the present disclosure.

Hereinafter, the embodiments of the present disclosure will be described in sufficient detail with reference to the accompanying drawings for those skilled in the art to easily practice the invention. The present disclosure may be embodied in many different forms, and is not limited to the embodiments described herein.

To describe the present disclosure clearly, any irrelevant description is omitted herein, and identical reference numerals are affixed to identical or similar elements throughout the specification.

Additionally, the size and thickness of each element in the drawings are arbitrarily represented for convenience of description, and the present disclosure is not necessarily limited to the illustrations. In the drawings, the thickness is enlarged to clearly depict layers and ranges. Additionally, in the drawings, for convenience of description, the thicknesses of some layers and ranges are exaggerated.

The present disclosure relates to a composite pad manufactured from a fire extinguishing and flame retardant composition for suppressing fire propagation, a method for manufacturing the same, and a secondary battery module and a secondary battery pack using the composite pad.

The present disclosure manufactures a composite pad having a multilayer structure from a polymer resin based pad containing a flame retardant and fire extinguishing functional material and inserts it into a secondary battery module and a secondary battery pack to improve battery safety by the unit of secondary battery module.

FIG. 1 is a cross-sectional view of a composite pad according to an embodiment of the present disclosure. FIG.

2 is a cross-sectional view of a composite pad according to another embodiment of the present disclosure. FIG. 3 is a partial cutaway perspective view of the composite pad shown in FIG. 2.

Figure 2:
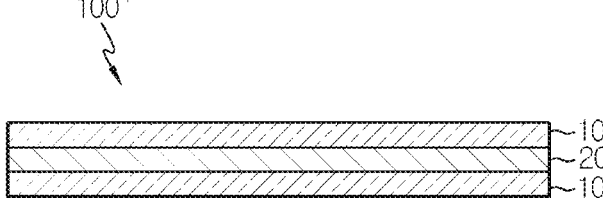
FIG. 2 is a cross-sectional view of a composite pad according to another embodiment of the present disclosure.
Figure 3:
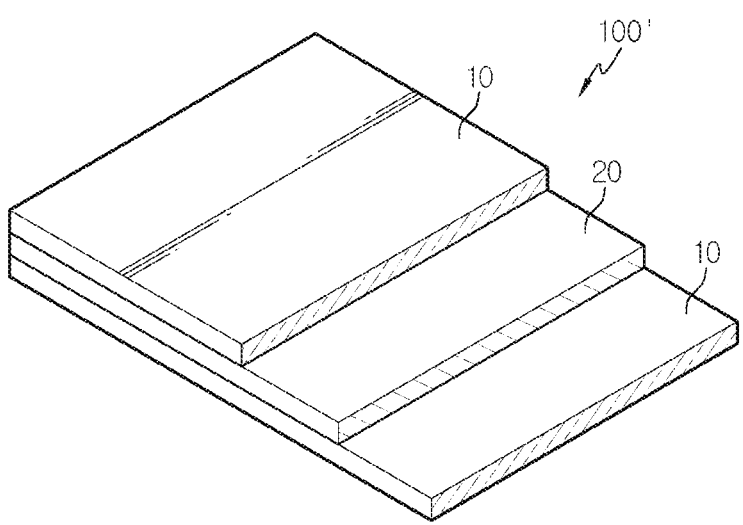
FIG. 3 is a partial cutaway perspective view of the composite pad shown in FIG. 2.

Referring to FIGS. 1 to 3, the composite pad 100, 100' according to the present disclosure includes a first polymer resin single layer 10 and a second polymer resin single layer 20. The first polymer resin single layer 10 and the second polymer resin single layer 20 include different types of fire extinguishing materials. The different types of fire extinguishing materials may indicate materials having functionally different fire extinguishing and flame retardant mechanisms, and indicate materials that are different from each other.

The composite pad 100, 100' according to the present disclosure includes a stack of two or more polymer resin single layers such as the first polymer resin single layer 10 and the second polymer resin single layer 20. The composite pad 100, 100' is a pad made of a polymer resin containing a fire extinguishing material, and can effectively suppress a fire or explosion in a secondary battery.

There is no particular limitation to the thickness of each of the first polymer resin single layer 10 and the second polymer resin single layer 20 and the thickness of the composite pad 100, 100' including them. The thickness may be appropriately set in the range from the minimum thickness for forming a uniform layer by a method for forming a film using a polymer resin to the maximum thickness taking the production costs into account while not increasing the size of a secondary battery module so much when inserted into the secondary battery module.

The first polymer resin single layer 10 and the second polymer resin single layer 20 are a polymer resin based pad containing a flame retardant and fire extinguishing functional material called "fire extinguishing material", and includes a fire extinguishing material and a polymer resin.

The fire extinguishing material refers to a material or a mixed material that extinguishes a fire, i.e., preferably suppresses a fire and/or inhibits or retards the occurrence of a fire. Preferably in relation to the present disclosure, the fire extinguishing effect refers to a fire inhibition effect, i.e., an effect of suppressing or abating the continuation or occurrence of a fire. Main examples of the preferred material of the fire extinguishing material is a material which removes a reactant that makes a fire last from a fire source, or suppresses chemical reaction necessary to cause a fire or make the fire last, or a material which causes endothermic reaction that absorbs energy from flames to lower the temperature and put out the fire.

The fire extinguishing material may be selected from solid materials including a metal hydroxide compound, a phosphorus-based and sulfuric acid compound and a halogen-based compound. Additionally, the polymer resin may be methylmethacrylic resin, styrol resin, polyethylene resin, polyamide resin, phenol resin, silicon resin, epoxy resin or polyurethane resin. Typical examples of the fire extinguishing material may include aluminum hydroxide ($Al(OH)_3$), magnesium hydroxide ($Mg(OH)_2$) or calcium bromide ($CaBr_2$). Preferably, the polymer resin itself is flame retardant, but to increase the flame retardancy, a film made of a composition of the polymer resin containing the fire extinguishing material or a polymer resin single layer which is a composite of the polymer resin and the fire extinguishing material may be formed.

The polymer resin (hereinafter referred to as a first polymer resin) included in the first polymer resin single layer 10 and the polymer resin (hereinafter referred to as a second polymer resin) included in the second polymer resin single layer 20 may be the same or different. However, the fire extinguishing material (hereinafter referred to as a first fire extinguishing material) included in the first polymer resin single layer 10 and the fire extinguishing material (hereinafter referred to as a second fire extinguishing material) included in the second polymer resin single layer 20 are of different types. In particular, the fire extinguishing material included in the first polymer resin single layer 10 is activated in the lower temperature range than the fire extinguishing material included in the second polymer resin single layer 20. In this sense, the first polymer resin single layer 10 may be referred to as a low temperature active layer, and the second polymer resin single layer 20 may be referred to as a high temperature active layer.

For example, the first fire extinguishing material is a material that takes the fire extinguishing and flame retardant effect in the low temperature range (for example, 200 to 400° C.). The second fire extinguishing material is a material that takes the fire extinguishing and flame retardant effect in the high temperature range (for example, 700° C. or above). When the fire extinguishing material in the first polymer resin single layer 10 and the fire extinguishing material in the second polymer resin single layer 20 have different working temperature ranges, the fire extinguishing effect is manifested stepwise according to the temperature.

Preferably, the first polymer resin single layer 10 includes poly(dimethyl siloxane) (PDMS) and $Al(OH)_3$, and the second polymer resin single layer 20 includes PDMS and $CaBr_2$. That is, the first polymer resin and the second polymer resin are equally PDMS, and the first fire extinguishing material is $Al(OH)_3$ and the second fire extinguishing material is $CaBr_2$. The fire extinguishing mechanism of $Al(OH)_3$ is different from the fire extinguishing mechanism of $CaBr_2$, and $Al(OH)_3$ exerts the fire extinguishing effect in the lower temperature range than $CaBr_2$.

The composite pad 100 of FIG. 1 has a double layer structure including the first polymer resin single layer 10 and the second polymer resin single layer 20 stacked on the first polymer resin single layer 10. The composite pad 100' of FIG. 2 has a triple layer structure including two first polymer resin single layers 10 and the second polymer resin single layer 20 sandwiched between the two first polymer resin single layers 10. Another example of the triple layer structure includes the first polymer resin single layer 10 sandwiched between two second polymer resin single layers 20, but it is preferred that the first polymer resin single layer 10 including the fire extinguishing material working in the lower temperature range is disposed on the outer side than the second polymer resin single layer 20, and thus is applied closer to the secondary battery than the second polymer resin single layer 20.

The composite pad 100' of FIG. 2 is a fire extinguishing and flame retardant functional composite pad of triple layer structure. $Al(OH)_3$ having good stability in air is included in the outermost layer and helps to ensure stability of the polymer resin layer including $CaBr_2$ corresponding to the inner layer, and when a fire occurs, it decomposes at relatively low temperatures (180 to 200° C.) by heat generated by contact with flame to produce inflammable aluminum oxide ($Al_2O_3$) and ($H_2O$). In this instance, the produced water cools down to lower the temperature of the flame rapidly.

When combustion continues, the temperature of the composite pad 100' rises and thermal decomposition of $CaBr_2$ included in the inner layer occurs at about 730° C. The thermal decomposition of $CaBr_2$ in the presence of oxygen (O$_2$) produces CaO and Br$_2$. The thermal decomposition of CaBr$_2$ in water produces CaO and HBr. HBr which is a product of thermal decomposition inhibits activated radicals (•O•, OH•, •H•) of high energy generated by combustion from acting as a chain carrier, leading to the chemical fire extinguishing effect.

As described above, the flame retardant and fire extinguishing functional flame retardant element for improving battery safety may be formed as the proposed multilayer structure composite pad 100, 100', including the first polymer resin single layer 10 corresponding to the outermost layer containing the fire extinguishing composition that takes the fire extinguishing and flame retardant effect in the low temperature range, and the second polymer resin single layer 20 corresponding to the inner layer containing the fire extinguishing composition that implements the fire extinguishing mechanism at high temperatures, to take the fire extinguishing effect stepwise according to the temperature. The polymer based composite pad manufactured with the above-described structure may be included in a secondary battery module as shown in FIG. 4.

Figure 4:
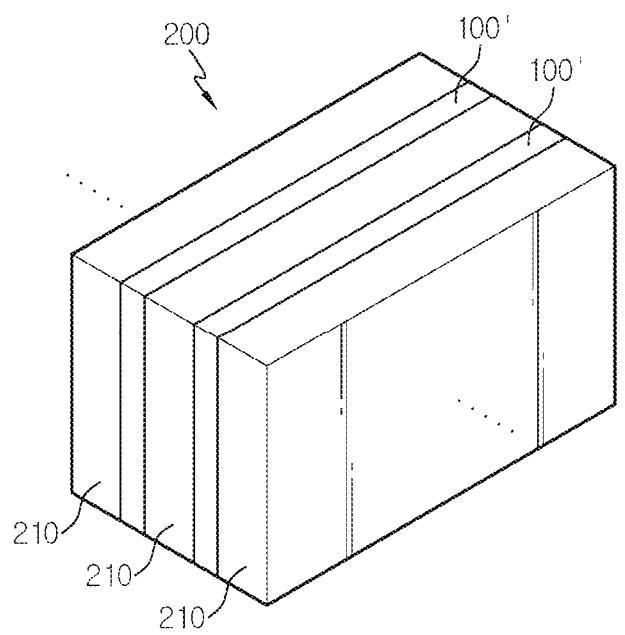
FIG. 4 is a schematic diagram showing a configuration of a secondary battery module according to the present disclosure.

FIG. 4 is a schematic diagram showing a configuration of a secondary battery module according to the present disclosure. Referring to FIG. 4, the secondary battery module 200 includes secondary batteries 210 and composite pads 100'. The composite pads 100' are interposed between the secondary batteries 210 to delay the movement of heat through endothermic reaction in the event of a fire, and exert the fire extinguishing function by suppressing the combustion reaction and propagation of the fire.

The secondary battery 210 may be a pouch type secondary battery. Each secondary battery 210 has a plate shape, and may be stacked and arranged with one or two surfaces in contact with adjacent secondary battery to form a stack. The composite pad 100' may be inserted around the stack of secondary batteries 210, but the composite pad 100' may be preferably inserted between every two secondary batteries 210 as shown to prevent a fire from spreading to other secondary battery when the fire occurs in any one secondary battery 210.

There may be provided a secondary battery pack including at least one secondary battery module 200. The secondary battery pack may be manufactured by combining the secondary battery modules 200 as unit modules according to the desired output and capacity, and when considering the mount efficiency and structural stability, the secondary battery pack may be preferably used as a source of power for electric vehicles, hybrid electric vehicles, plug-in hybrid electric vehicles and energy storage systems, but the range of applications is not limited thereto.

Hereinafter, a method for manufacturing a composite pad 100' will be described.

The composite pad 100' is manufactured by forming a first polymer resin single layer 10 and a second polymer resin single layer 20 in a sequential order.

First, a first fire extinguishing material and a first polymer resin are mixed to prepare a first flame retardant composition. The first flame retardant composition is applied to an appropriate substrate, for example, an aluminum plate or a glass substrate and cured to form the first polymer resin single layer 10. To form a layer having a uniform thickness, a casting process or its analogous process may be used. When the casting process is used, the first flame retardant composition is fed on a belt of a film forming device and pressed using a casting die to form a uniform thickness film.

A second fire extinguishing material and a second polymer resin are mixed to prepare a second flame retardant composition. The second flame retardant composition is applied to the first polymer resin single layer 10 and cured to form the second polymer resin single layer 20. To form a layer having a uniform thickness, a casting process or its analogous process may be used. When the process is completed, a composite pad 100 of a double layer structure is manufactured.

Subsequently, the first flame retardant composition is applied to the second polymer resin single layer 20 and cured to form the first polymer resin single layer 10. To form a layer having a uniform thickness, a casting process or its analogous process may be used.

The curing after applying the first flame retardant composition and the second flame retardant composition may be performed at 85° C. for 4 hours.

Here, the first flame retardant composition is prepared by adding the first fire extinguishing material in an amount of more than 0 and 50% or less to the first polymer resin to form a first mixture, and stirring the first mixture using a stirrer to uniformly disperse the first fire extinguishing material in the first polymer resin. For uniform mixing in the first mixture, stirring using a magnetic bar and/or sonication may be performed. Subsequently, for uniform mixing, an additional stirring operation may be performed with an addition of a curing agent in a predetermined percentage.

Additionally, the second flame retardant composition is prepared by adding the second fire extinguishing material in an amount of more than 0 and 80% or less to the second polymer resin to form a second mixture, and stirring the second mixture using a stirrer to uniformly disperse the second fire extinguishing material in the second polymer resin. Subsequently, for uniform mixing, an additional stirring operation may be performed with an addition of a curing agent in a predetermined percentage.

Additionally, the first fire extinguishing material may include Al(OH)$_3$ and the second fire extinguishing material may include CaBr$_2$. The first polymer resin and the second polymer resin may be PDMS. The PDMS based composite pad may be flame retardant and flexible.

In this way, the composite pad 100' of a triple layer structure may be manufactured. Additionally, the multi-layer structure pad of triple or more layers may be manufactured through the repeated stacking processes until the final target thickness is reached. The composite pad 100' is obtained as a freestanding solidified plate which is easily separated from the substrate, for example, an aluminum plate or a glass substrate coated with the first polymer resin single layer 10 or the belt of the film forming device.

Hereinafter, the present disclosure will be described in more detail through an experimental example. However, the present disclosure is not limited to the following experimental example.

Comparative Example 1-1

A polymer resin single layer is formed using PDMS alone. That is, a PDMS layer not including a fire extinguishing material is formed. It is found that the film forming method used in the experiment can form a layer which is at least 0.4 mm thick. The PDMS layer of comparative example 1-1 is 0.4 mm in thickness.

Comparative Example 1-2

A polymer resin single layer is formed using PDMS alone. That is, a PDMS layer not including a fire extinguishing material is formed. The thickness is 1.5 mm.

Comparative Example 2-1

A first polymer resin single layer (PDMS+Al(OH)$_3$) including PDMS and Al(OH)$_3$ is formed. The thickness is 0.4 mm.

Comparative Example 2-2

A first polymer resin single layer including PDMS and Al(OH)$_3$ is manufactured. The thickness is 1.5 mm.

Comparative Example 3-1

A second polymer resin single layer (PDMS+CaBr$_2$) including PDMS and CaBr$_2$ is formed. The thickness is 0.4 mm.

Comparative Example 3-2

A second polymer resin single layer including PDMS and CaBr$_2$ is formed. The thickness is 1.5 mm.

Comparative Example 4

A 0.5 mm thick PDMS layer is formed, and a 0.5 mm thick second polymer resin single layer including PDMS and CaBr$_2$ is stacked on the PDMS layer. Another PDMS layer having the thickness of 0.5 mm is stacked on the second polymer resin single layer. Accordingly, a triple layer structure of PDMS/PDMS+CaBr$_2$/PDMS having the thickness of 1.5 mm is manufactured.

Comparative Example 5

A 1.5 mm thick mica sheet is prepared.

EXAMPLE

A 0.5 mm thick first polymer resin single layer including PDMS and Al(OH)$_3$ is formed, and a 0.5 mm thick second polymer resin single layer including PDMS and CaBr$_2$ is stacked on the first polymer resin single layer. Another first polymer resin single layer including PDMS and Al(OH)$_3$ having the thickness of 0.5 mm is stacked on the second polymer resin single layer. In this way, a triple layer structure of PDMS+Al(OH)$_3$/PDMS+CaBr$_2$/PDMS+Al(OH)$_3$ having the thickness of 1.5 mm is manufactured.

Figure 5:
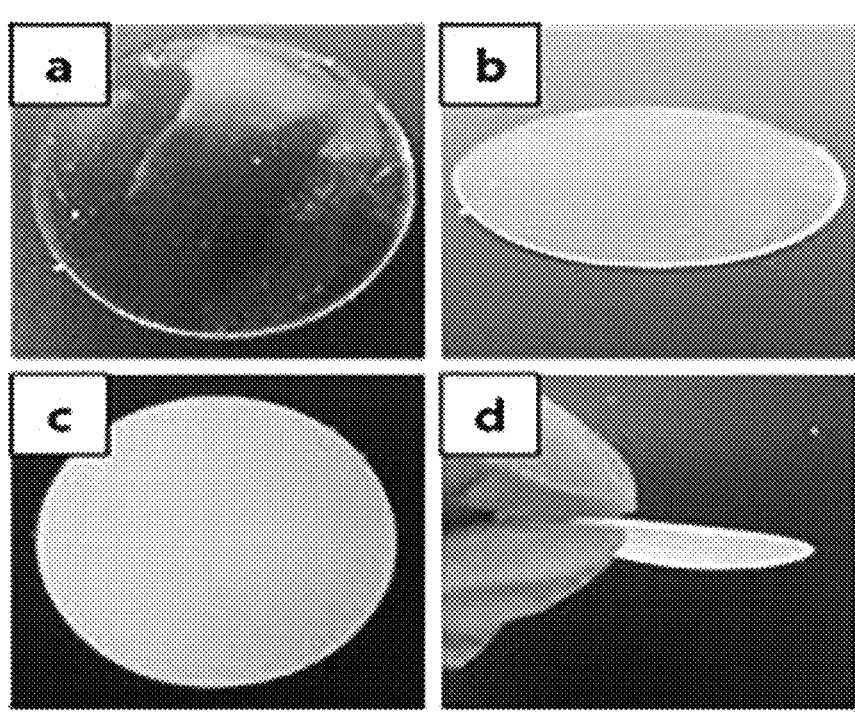
FIG. 5 shows photographic images of comparative examples.

FIG. 5 shows photographic images of comparative examples.

In FIG. 5, (a) and (b) are photographic images of comparative example 1-1, (c) is a photographic image of comparative example 2-1, and (d) is a photographic image of comparative example 3-1. The PDMS single layer and the layer including PDMS and the fire extinguishing material are 0.4 mm in thickness. The result shows that the film forming method used in the present disclosure can form a layer which is at least 0.4 mm thick.

To evaluate the flame retardant properties of comparative example and example, UL-94 (Underwriters Laboratories, vertical burning test) evaluation is performed. UL-94 is a flame retardancy (inflammability) evaluation item, especially of plastics, and the test is performed to evaluate the combustion aspect of a product and the extent of flame propagation to the surroundings when a flame is applied in the vertical direction of the product. Through this, the self-extinguishing extent is measured. The actual standard test is performed by preparing a specimen of a predetermined size, bringing flame into contact with the center of the bottom of the specimen over 10 times, dropping 6 inch flame from the specimen, and measuring the combustion time of the specimen. Immediately after extinguishing a fire, flame is brought into contact with the specimen again for 20 sec and is removed. Grading is performed by recording the combustion time, the growing time and whether ignition occurred in a surgical cotton placed below 12 inch.

Figure 6:
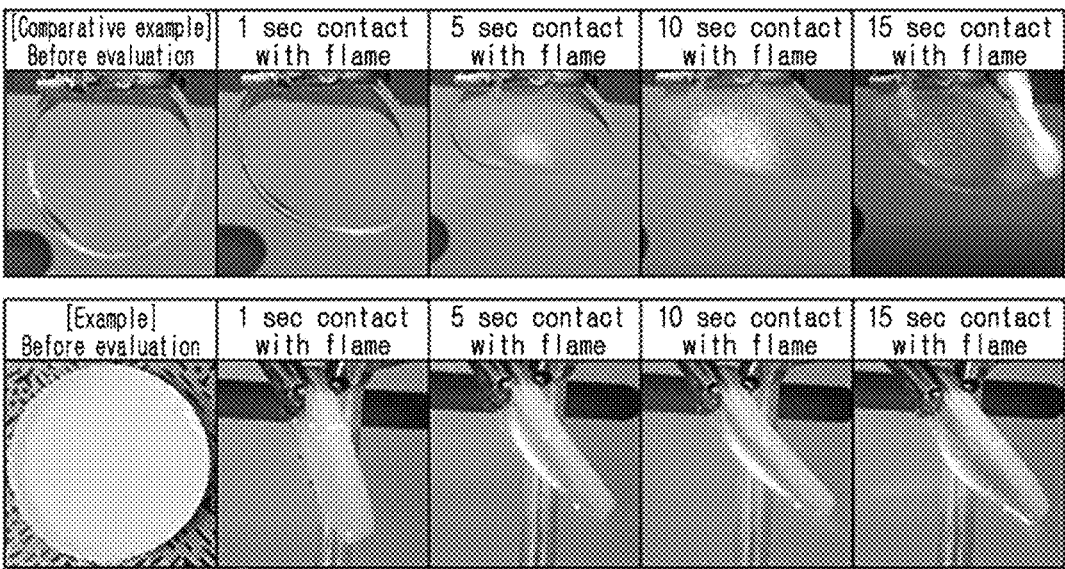
FIG. 6 shows photographic images of comparison between comparative example 1-2 and example before evaluation and ~15 sec after flame contact.

FIG. 6 shows photographic images of comparison between comparative example 1-2 and example before evaluation and ~15 sec after flame contact.

Comparative example 1-2 does not include the fire extinguishing material. As the flame contact time gradually increases, the red area increases due to the growing flame. In the example, in contrast, the flame contact time gradually increases, but growing is small. Accordingly, it is found that the present disclosure is more flame retardant, and in case that the composite pad is applied into a secondary battery module or pack, it is expected to prevent flames from turning into a fire when the flames occur in a secondary battery.

Figure 7:
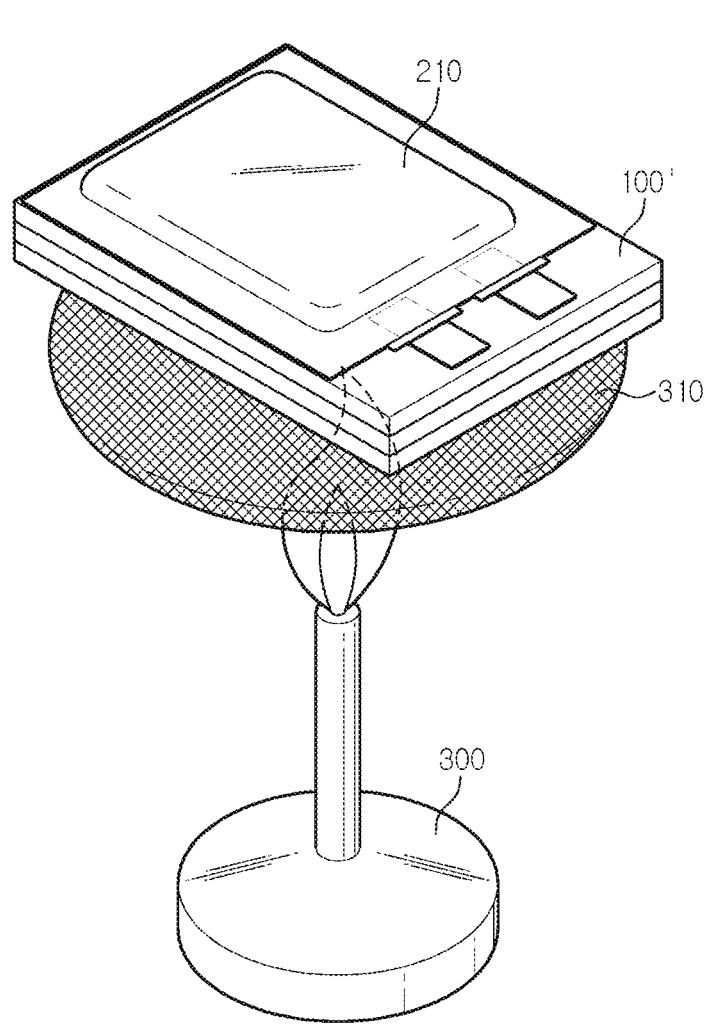
FIG. 7 is a diagram showing an experiment of measurement of the fire propagation time to secondary batteries through comparative examples and example.

FIG. 7 is a diagram showing an experiment of measurement of the fire propagation time to secondary batteries through comparative examples and example. The example is shown for illustration.

The composite pad 100' of example is placed on a die 310 on a gas burner 300, the secondary battery 210 is placed on the composite pad 100', and the time of propagation of flames arising from the gas burner 300 is measured by monitoring the voltage of the secondary battery 210. Graphtec GL3820 is used to measure.

Figure 8:
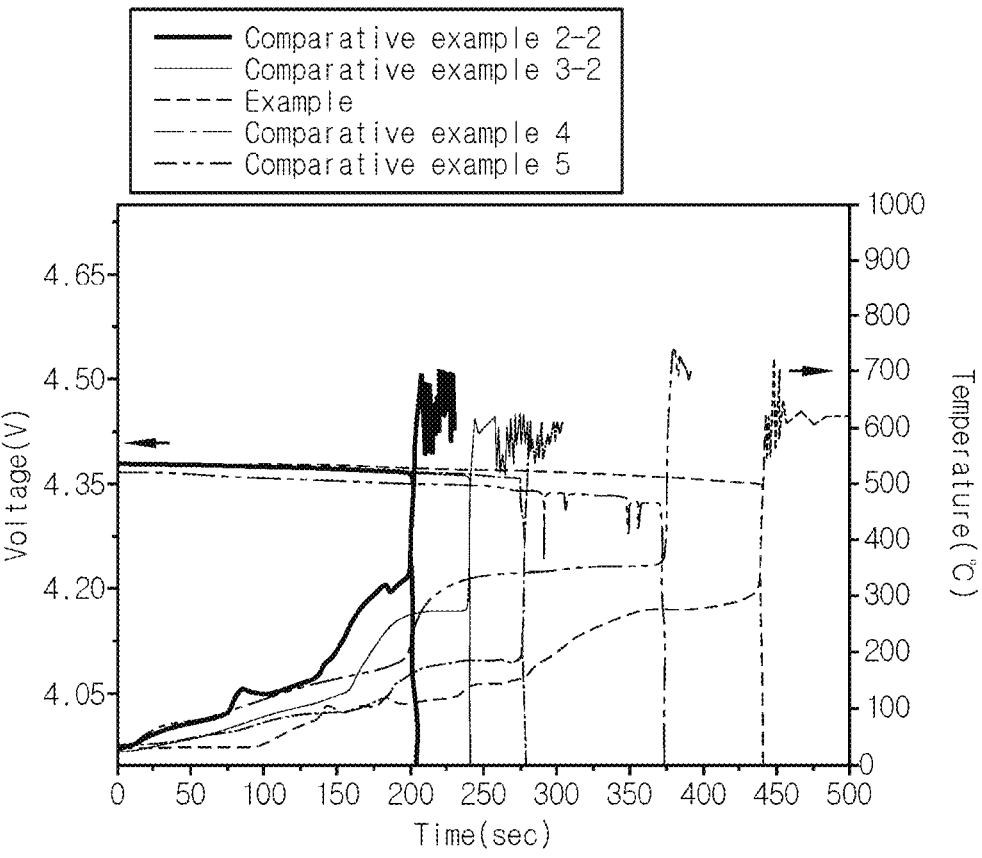
FIG. 8 is a graph showing the measured fire propagation time to secondary batteries through comparative examples and example.

FIG. 8 is a graph showing the measured fire propagation time to secondary batteries through comparative examples and example.

Those used in the experiment are all 1.5 mm thick; comparative example 2-2 and comparative example 3-2 of single layer structure, example and comparative example 4 of triple structure, and comparative example 5 of mica sheet.

In FIG. 8, the horizontal axis indicates the time, the left vertical axis indicates the voltage of the secondary battery 210, and the right vertical axis indicates the temperature of the secondary battery 210. When flames of the gas burner 300 spread to the secondary battery 210 through comparative example and example, the maximum peak is found at the temperature when it is impossible to measure the voltage of the secondary battery 210. The time at which the peak appears is the fire propagation time. The fire propagation time is summarized in Table 1.

TABLE 1

| Type | Single structure | | Triple structure | | Mica sheet |
| | Comparative example 2-2 | Comparative example 3-2 | Example | Comparative example 4 | Comparative example 5 |
| --- | --- | --- | --- | --- | --- |
| Fire propagation time (sec) | 200 | 240 | 439 | 277 | 375 |

As can be seen from FIG. 8 and the results of Table 1, in the case of example of the present disclosure, the fire propagation time is much longer. In particular, example of the present disclosure shows better performance than not only comparative example 2-2 and comparative example 3-2 of a single layer structure, but also comparative example 5 that is relatively advantageous in terms of thermal conductivity. Besides, it is found that the performance is better by about 70% or above than comparative example 4 of a triple structure in the same way as example of the present disclosure of multilayer structure.

In particular, on the graph of FIG. 8, example of the present disclosure shows a gentle temperature rise gradient in a temperature curve over time from the low temperature range to high temperatures (before a fire occurs). That is, it is determined that the structure including the high temperature active layer sandwiched between the low temperature active layers has the outstanding thermal propagation suppression effect.

While the preferred embodiments of the present disclosure have been hereinabove described in detail, the scope of protection of the present disclosure is not limited thereto and many changes and modifications made on the ordinary level using the basic concept of the present disclosure defined in the appended claims fall in the scope of protection of the present disclosure.

What is claimed is:

1. A composite pad having a stack of at least three polymer resin single layers comprising two first polymer resin single layers and a second polymer resin single layer sandwiched between the two first polymer resin single layers, and each first polymer resin single layer includes a first fire extinguishing material that takes effect in a temperature range of 200 to 400° C., and the second polymer resin single layer includes a second fire extinguishing material that takes effect in a temperature range of 700° C. or above.

2. A composite pad, having a stack of at least two polymer resin single layers including different types of fire extinguishing materials, wherein the at least two polymer resin single layers comprises a first polymer resin single layer and a second polymer resin single layer, and wherein the first polymer resin single layer includes poly(dimethyl siloxane) (PDMS) and aluminum hydroxide (Al(OH)$_3$), and the second polymer resin single layer includes poly(dimethyl siloxane) and calcium bromide (CaBr$_2$).

3. The composite pad according to claim 2, wherein the at least two polymer resin single layers comprises the second polymer resin single layer sandwiched between two of the first polymer resin single layers.

4. The composite pad according to claim 1, wherein each of the first and second fire extinguishing materials is selected from solid materials including a metal hydroxide compound, a phosphorus-based and sulfuric acid compound and a halogen-based compound.

5. The composite pad according to claim 1, wherein each of the at least two polymer resin single layers includes a respective polymer resin that is selected from materials including methylmethacrylic resin, styrol resin, polyethylene resin, polyamide resin, phenol resin, silicon resin, epoxy resin or polyurethane resin.

6. The composite pad according to claim 1, wherein each of the first and second fire extinguishing materials is selected from materials including aluminum hydroxide (Al(OH)$_3$), magnesium hydroxide (Mg(OH)$_2$) or calcium bromide (CaBr$_2$).

7. A method for manufacturing a composite pad, comprising forming at least three polymer resin single layers comprising two first polymer resin single layers and a second polymer resin single layer sandwiched between the two first polymer resin single layers, and each first polymer resin single layer includes a first fire extinguishing material that takes effect in a temperature range of 200 to 400° C., and the second polymer resin single layer includes a second fire extinguishing material that takes effect in a temperature range of 700° C. or above.

8. The method for manufacturing a composite pad according to claim 7, wherein the forming of the at least three polymer resin single layers comprises:

mixing the first fire extinguishing material with a first polymer resin to prepare a first flame retardant composition;

applying the first flame retardant composition and curing to form the two first polymer resin single layers;

mixing the second fire extinguishing material with a second polymer resin to prepare a second flame retardant composition; and applying the second flame retardant composition to one of the two first polymer resin single layers and curing to form the second polymer resin single layer.

9. The method for manufacturing a composite pad according to claim 8, wherein preparing of the first flame retardant composition includes:

adding the first fire extinguishing material in an amount of more than 0 to 50% or less to the first polymer resin to form a first mixture;

stirring the first mixture; and adding a curing agent to the first mixture, and the preparing of the second flame retardant composition includes:

adding the second fire extinguishing material in an amount of more than 0 to 80% or less to the second polymer resin to form a second mixture;

stirring the second mixture; and adding a curing agent to the second mixture.

10. The method for manufacturing a composite pad according to claim 9, wherein the first fire extinguishing material includes aluminum hydroxide (Al(OH)$_3$) and the second fire extinguishing material includes calcium bromide (CaBr$_2$).

11. The method for manufacturing a composite pad according to claim 7, wherein the first polymer resin single layer includes poly(dimethyl siloxane) (PDMS) and aluminum hydroxide (Al(OH)$_3$), and the second polymer resin single layer includes poly(dimethyl siloxane) and calcium bromide (CaBr$_2$).

12. The method for manufacturing a composite pad according to claim 7, wherein each of the first and second fire extinguishing materials is selected from solid materials including a metal hydroxide compound, a phosphorus-based and sulfuric acid compound and a halogen-based compound.

13. The method for manufacturing a composite pad according to claim 7, wherein each of the at least two polymer resin single layers includes a respective polymer resin that is selected from materials including methylmethacrylic resin, styrol resin, polyethylene resin, polyamide resin, phenol resin, silicon resin, epoxy resin or polyurethane resin.

14. The method for manufacturing a composite pad according to claim 7, wherein each of the first and second fire extinguishing materials selected from materials including is aluminum hydroxide ($Al(OH)_3$), magnesium hydroxide ($Mg(OH)_2$) or calcium bromide ($CaBr_2$).

15. A secondary battery module comprising the composite pad according to claim 1.

16. A secondary battery pack comprising the secondary battery module according to claim 15.

\* \* \* \* \*